United States Patent [19]

Hanson et al.

[11] Patent Number: 5,191,587
[45] Date of Patent: Mar. 2, 1993

[54] BLUE GENERATION AT THE H-BETA FRAUNHOFER WAVELENGTH USING NONCRITICALLY PHASE-MATCHED OPTICAL PARAMETRIC GENERATION IN LITHIUM BORATE (LIB$_3$O$_5$)

[75] Inventors: Frank Hanson, San Diego, Calif.; David Dick, Salt Lake City, Utah

[73] Assignee: The United States of America as represented by the Secretary of the Navy, Washington, D.C.

[21] Appl. No.: 814,027

[22] Filed: Dec. 26, 1991

[51] Int. Cl.$^5$ .............................................. H01S 3/10
[52] U.S. Cl. ..................................... 372/21; 359/327; 372/34; 372/20
[58] Field of Search ..................... 372/21, 22, 20, 34; 359/328

[56] References Cited

U.S. PATENT DOCUMENTS 4,413,342  11/1983  Cohen et al. ............................ 372/22
4,791,631  12/1988  Baumert et al. ........................ 372/22
4,826,283   5/1989  Chuangtian et al. ................... 350/328

*Primary Examiner*—Leon Scott, Jr.
*Attorney, Agent, or Firm*—Harvey Fendelman; Thomas Glenn Keough

[57] ABSTRACT

An optical blue parametric generation relies upon a nonlinear optical crystal of lithium borate (LiB$_3$O$_5$) properly oriented to generate blue light when appropriately located in a resonant optical cavity and pumped with high intensity light at 355 nm. Beam walk-off and beam pump divergence are greatly reduced due to a specific orientation of non-critical phase-matching so that the 355 nm pump source provides for a sufficient phase-match for output generation near the H Beta Fraunhofer wavelength at 486 nm and also provides for a temperature tuning of the lithium borate crystal to permit exact coincidence to a particular output wavelength so that optical parametric generation from 470 to 487 nm may be assured by the appropriately tuned lithium borate crystal.

6 Claims, 1 Drawing Sheet

BLUE GENERATION AT THE H-BETA FRAUNHOFER WAVELENGTH USING NONCRITICALLY PHASE-MATCHED OPTICAL PARAMETRIC GENERATION IN LITHIUM BORATE (LIB$_3$O$_5$)

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

No practical solid state laser sources operate directly in the blue-green spectral region. Solid state lasers that can be pumped with efficient high power laser diode arrays are especially attractive for a wide variety of applications, such as communications and remote sensing, due to their compact size and weight and long lifetime. Neodymium based solid state lasers using diode pumps have been demonstrated with electrical to optical efficiencies of ~10% in the high power Q-switch mode. However, although these lasers emit in the infrared near 1 micron, a desirability is unrealized to be able to shift the output to the blue-green spectral region in order to take advantage of the increased transmission in seawater. In addition, there are certain narrow wavelength bands throughout this region, the Fraunhofer lines, where the solar irradiance is significantly decreased; see the article by J. M. Beckers, C. A. Bridges, and L. B. Gilliam, report AFGL-TR-76-0126, Air Force Geophysics Lab., Hanscom AFB (1976). The H-Beta Fraunhofer line at 486.13 nm is an especially attractive wavelength to operate a laser/receiver system due to its large width (~1Å FWHM (full width half maximum)) and an irradiance of less than 15% of the continuum at line center.

There are a number of possible methods to generate a high power solid state source at 486 nm beginning with a neodymium laser operating at ~1.06 micron. These methods generally involve nonlinear frequency conversion techniques which must be tunable at some stage in order to exactly match the required wavelength. The technique of optical parametric oscillation (OPO) is such a technique. This method requires a high power pump source which can be made to generate two additional waves of lower frequency due to nonlinear polarization in a suitable crystal. These waves are generally known as the signal and idler waves. The frequency and wave vector of the pump wave must equal the sum of the frequencies and wave vectors of the signal and idler waves. This requirement is known as phase-matching and is only possible in certain crystal for certain sets of frequencies and orientations of that crystal.

Present methods of generating 486 nm using the optical parametric oscillator (OPO) technique involve phase-matching by angle tuning of the nonlinear crystal. Such a technique has been described using 355 nm from a frequency tripled Nd:YAG laser to pump a BaB$_2$O$_4$ crystal oriented ~28 degrees to the c-axis; see the article by Y. X. Fan, R. C. Eckardt, R. L. Byer, J. Nolting, and R. Wallenstein, *Appl. Phys. Lett*, vol. 53, p. 2014 (1988). The technique of angle tuned phase-matching has a number of drawbacks. In order to control the precise wavelength of the generated output, the pump source is required to have a low beam divergence since the phase-matched signal wavelength is related to the pumping angle. Also, because of double refraction, the pump beam travels at a small angle to at least one of the generated beams in the crystal which leads to a reduction in their spatial overlap. This leads to decreased efficiency for converting the pump energy to signal energy. This effect is sometimes known as beam walk-off. Both of these effects often lead to practical imitations in OPO devices and can prevent scaling to larger sizes and higher power.

The nonlinear lithium borate crystal LiB$_3$O$_5$ (LBO), which was recently developed in China, has received considerable attention for frequency mixing, as reported by C. Chen, Y. Wu, A. Jiang, B. Wu, G. You, R. Li, and S. Lin, *J. Opt. Soc. Am.* vol. B 6, p. 616 (1989); B. Wu, N. Chen, C. Chen, D. Deng, and Z. Xu, *Opt. Lett*, vol. 14, p. 1080 (1989); J. T. Lin, J. L. Montgomery, J. R. DeSalvo, and A. M. Horner, in *Digest of Topical Meeting on Advanced Solid State Lasers*, Optical Society of America, Washington, DC (1990), pp. 64–66; J. T. Lin, J. R. DeSalvo, J. L. Montgomery, and K. Kato, in *Conference on Lasers and Electro-Optics*, Vol. 7 of OSA 1990 Technical Digest Series, Optical Society of America, Washington, DC (1990), pp. 280–281; T. Ukachi, R. J. Lane, W. R. Bosenberg, and C. L. Tang, *Appl. Phys. Lett.*, vol. 57, p. 980 (1990); and S. Lin, Z. Sun, B. Wu, and C. Che, *J. Appl. Phys.* vol. 67, p. 634 (1990); and parametric generation applications, see the article by M. Ebrahimzadeh, G. Robertson, M. H. Dunn, and A. J. Henderson, in *Conference on Lasers and Electro-Optics*, Vol. 7 of OSA 1990 Technical Digest Series, Optical Society of America, Washington, DC (1990), pp. 659–660. Lithium borate has a number of advantages compared with BaB$_2$O$_4$ (BBO), a similar crystal also developed in China. The transmission extends further into the UV, it is not hygroscopic, and optical damage thresholds are reported to be even higher than for BBO. LBO is a biaxial crystal in the symmetry class mm2. The principal axes of the optical indicatrix, with the convention $n_z > n_y > n_x$, are related to the piezoelectric axes, which are used for the nonlinear response matrix, $d_{ij}$, by $(x,y,z) \rightarrow (a,c,b)$. LBO has a more complex phase-matching geometry than the uniaxial material BBO. Second-harmonic generation of 1.06 μm is possible with both type I and type II orientations at 11° from the x axis in the xy plane and 15 from the z axis in the zy plane, respectively; note the article by C. Chen et al. cited above. In accordance with this inventive concept, when the phase-matching condition is this near one of the principal axes, temperature tuning might form the basis to achieve noncritical phase-matching along that axis. An appropriate geometry such as disclosed in the disclosure of this inventive concept permits a significantly larger angular acceptance for the pump wave and eliminates the problem of double refraction. The angular acceptance is one constraint that often limits phase-matching path lengths and conversion efficiencies in practice. Noncritical type I phase-matched second-harmonic generation was recently demonstrated for fundamental wavelengths from 1025 to 1253 nm over the temperature range from 190° C. to −3° C., note the article by Ukachi et al. referenced above.

Thus, a continuing need exists in the state of the art for a parametric generation from temperature-tuned lithium borate at wavelengths of the Fraunhofer lines including H-Beta to assure increased transmission in seawater with reduced interference from background solar noise.

SUMMARY OF THE INVENTION

The present invention is directed to providing parametric generation at the wavelengths of Fraunhofer lines including H-Beta from temperature-tuned lithium borate. A lithium borate crystal is appropriately aligned to present its z axis for noncritical phase-matched orientation to a 355-nm pump wavelength and by appropriate temperature tuning of the crystal effect a 480 nm output at room temperature or a specific generation of blue light at the wavelength of the H-Beta Fraunhofer line at 486.13 nm.

An object of the invention is to provide an optical parametric generation near 486 nm using the nonlinear crystal lithium borate.

Another object of the invention is to provide for optical parametric generation near 486 nm relying on a nonlinear lithium borate crystal in a noncritical phase-matched orientation to the pump wavevector.

Yet another object is to provide a nonlinear lithium borate crystal oriented in a noncritical phase-matched relationship to a pump wavevector to reduce the problems of beam walk-off.

Another object of the invention is to provide a nonlinear lithium borate crystal oriented for a noncritical phase-matched orientation with respect to a pump wavevector which greatly reduces the requirements on pump beam divergence otherwise inherent in angle tuned phase-matching.

Another object is to provide for a phase-matching condition near one of the principal axes provided by temperature tuning to form the basis to achieve noncritical phase-matching along that axis.

Another object of the invention is to provide for the optical parametric generation near 486 nm using a nonlinear lithium borate crystal in a noncritical phase-matched orientation to a pump wavevector to assure the tuning of the output wavelength by varying the crystal temperature.

These and other objects of the invention will become more readily apparent from the ensuing specification and claims when taken in conjunction with the appended drawings.

DESCRIPTION OF THE PREFERRED EMBODIMENT

Figure 1:
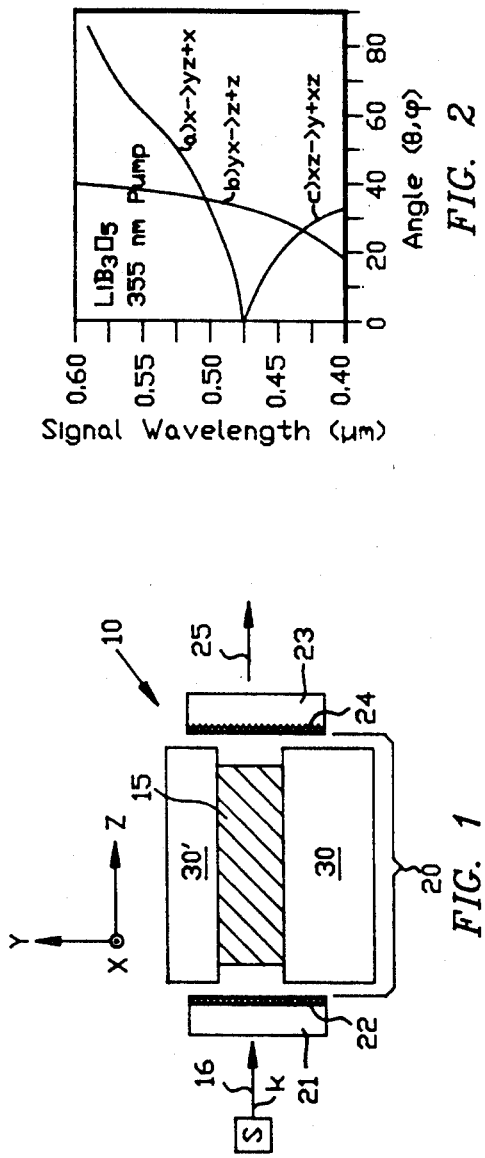
FIG. 1 is a schematic depiction of an optical layout for generation of 486 nm using temperature tuned noncritically phase-matched lithium borate ($LiB_3O_5$) in an optical parametric oscillator.

Referring now to FIG. 1 of the drawings, an optical parametric oscillator (OPO) 10 fabricated in accordance with the teachings of this inventive concept is provided with a nonlinear lithium borate ($LiB_5O_5$) crystal 15 disposed in an optical cavity 20 where an output resonant signal 25 and an idler signal (not shown) are generated. A pumping wavelength 16 at 355 nm is generated by a suitable source S, for example, a neodymium YAG (Nd:YAG) laser emitting at, for example, a 1064 nm fundamental which is frequency tripled to arrive at 355 nm. The 355 nm pumping wavelength 16 is incident on lithium borate crystal 15 after passing through a dichroic mirror 21 having an appropriate coating 22 which is transmissive to the pumping wavelength 16 yet highly reflective to the wavelength of emission, output wavelength 25. An output coupler mirror 23 is located on the other side of lithium borate crystal 15. The output coupler mirror is provided with a coating 24 which is partly transmissive to output signal wavelength 25. The output signal wavelength 25 was measured with a 0.5m spectrometer and a reticon detector array commercially marketed by E. G. and G. Inc.

Lithium borate crystal 15 is mounted in a heat sink 30 which is in contiguous contact with at least a portion of the lithium borate crystal to responsively impart a selective temperature tuning. The heat sink is depicted as being in two parts in FIG. 1, it being understood that the heat sink is preferably an integral design to simplify the tuning of the crystal although discrete portions might be acceptable for some applications. Preferably, the idler signal or wave is not resonated at all in the particular optical parametric oscillator in order to allow a continuous tuning of the output signal wavelength. In this particular configuration a desired 486 nm output signal wavelength can be reached by maintaining the lithium borate crystal at a temperature close to −29° C.

Heat sink 30 was selected to be an aluminum block with a thermocouple inserted into a small hole, not shown, near lithium borate crystal 15. Temperature control was provided by appropriate actuation of a resistive heating element. For low temperature measurements a thermoelectric cooler was appropriately mounted on the aluminum block to provide a chilled heat sink. A small enclosure was placed over the optical parametric oscillator, or more specifically, the components associated with optical cavity 20. This enclosure was purged with dry nitrogen to prevent condensation that might form as a consequence of varying the temperature of the components.

Successful operation of an optical parametric oscillator 10 relies upon the use of a nonlinear lithium borate ($LiB_3O_5$) optical crystal 15 disposed in a specific orientation in resonant optical cavity 20. When it is pumped with a high intensity 355 nm light 16, a blue light output signal wavelength 25 is generated. The appropriate orientation of the enumerated components and the pumping wavelength results in an optical parametric generation of an output signal wavelength.

A realization of the advantages of this inventive concept involves a specific orientation of lithium borate crystal 15 with respect to the orientation of the pumping wavevector as represented by vector k in FIG. 1. This specific orientation eliminates the problem of beam walk-off and greatly reduces requirements on pump divergence inherent in angle tuned phase-matching. Lithium borate crystal 15 is oriented for colinear propagation of the pumping wavelength vector k with generated or emitted output signal waves 25 along the z-axis of lithium borate crystal 15 in a geometry known as noncritical phase-matching. A 335 nm pumping wavelength 16 emitted in the direction of pumping wavelength vector k and colinearly propagating along the crystal z axis will be phase-matched for output signal wavelength 25 generation near the H-Beta Fraunhofer wavelength at 486 nm. This 486 nm wavelength can be tuned to exact coincidence by simply changing the temperature of lithium borate crystal 15.

Figure 2:
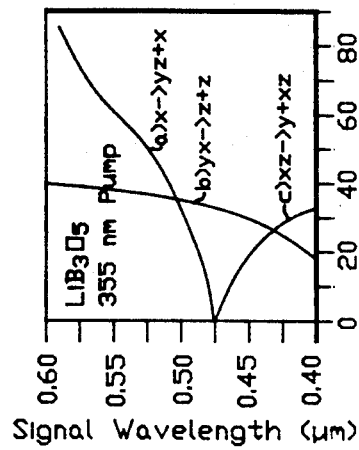
FIG. 2 shows signal wavelength phase-matching curves calculated for parametric generation in lithium borate with a 355 nm pump (the polarizations indicated are for the pump, the signal, and the idler, and the angles for curves "a", "b" and "c" are from the pump wave vector k to the z, x and z axes, respectively).

Lithium borate is a biaxial crystal with an optical indicatrix described by three distinct indices of refraction: $n_x$, $n_y$ and $n_z$. The (x,y,z) coordinate system is defined by the convention that $n_z > n_y > n_x$. Phase-matching requirements are that $\omega_p = \omega_s + \omega_i$ and $\omega_i n_i$, where $\omega$ is the optical frequency and the subscripts refer to the pump, signal and idler waves, respectively. The refractive indices depend on the wavelength, polarization and wavevector direction. Sellmeier coefficients, which can be used to calculate the wavelength dependence of the indices, have been published, see the C. Chen article cited above, and were used to calculate phase-matching curves for propagation in the three principal planes of the optical indicatrix using a 355 nm pumping wavelength. These curves, shown in FIG. 2, relate the signal wavelength to the angle between the pump wave vector and the principal axis. For curve "c" propagation is in the x-z plane and the angle $\theta$ is from the z axis. Similarly, for curve "a" the angle $\theta$ is from the z- axis in the y-z plane; and for curve "b" the angle $\phi$ is from the x-axis in the y-x plane. This inventive concept involves the geometry where propagation is along the z-axis and is represented by the intersections of curves "c" and "a". Here the polarizations of the pump, signal and idler are along the "x", "y" and "x" axes, respectively.

As mentioned above, FIG. 2 shows the phase-matching curves for parametric generation using a 355 nm pump source. These curves were calculated from a Sellmeier dispersion function $$n^2 = a + \frac{b}{c - \lambda^2} + d\lambda^2. \quad (1)$$

If the electric polarization is assumed to be orthogonal to k, then the effective nonlinear coefficients for the three cases are given by $$d_{eff}(x \to yz, x) = d_{15} \cos(\theta), \quad (2a)$$

$$d_{ff}(yx \to z, z) = d_{24} \cos(\phi), \text{ and} \quad (2b)$$

$$d_{eff}(xz \to y, xz) = d_{15} \cos^2(\theta) + d_{24} \sin^2(\theta) \quad (2c)$$

The polarization directions are given for pump 16, output signal 25, and the idler, and Kleinman symmetry is also assumed ($d_{24} = d_{32}$, $d_{15} = d_{31}$) The values of $d_{32} = 1.24$ pm/V and $d_{31} = -1.15$ pm/V have been measured, see the C. Chen et al. article.

Similarly to BBO, (see the articles by H. Vanherzeele and C. Chen, *Appl. Opt*, vol. 27, p. 2634 (1988); and Y. X. Fan, R. C. Eckhardt, R. L. Byer, C. Chen, and A. D. Jiang, *IEEE J. Quantum Electron*, vol. 25, p. 1196 (1989)), LBO's parametric output can be angle tuned continuously throughout the visible with a 355-nm pump; however, along the z-axis ($\theta = 0$), noncritical phase-matched operation is possible near the H-Beta dip in the solar spectrum at 486.13 nm.

Laser communication or remote-sensing systems operating at this wavelength would be able to take advantage of the reduced solar background, which is less than 20% of the continuum and ~0.1 nm FWHM.

By temperature tuning, this wavelength could be shifted into coincidence. The geometry for this process is type II, with the signal wave polarized along the y axis and the pump and idler waves polarized along the x axis. The external angular acceptance (half-angle, $\Delta KL = \pi$, where $\Delta K = k_p - k_s - k_i$) for the pump is given by $$\Delta\theta_{xz} = L^{-\frac{1}{2}} n_{xp} \left[ \frac{n_{xp}^3}{\lambda_p} (n_{xp}^{-2} - n_{zp}^{-2}) - \frac{n_{xi}^3}{\lambda_i} (n_{xi}^{-2} - n_{zi}^{-2}) \right]^{-\frac{1}{2}}, \quad (3)$$

$$\Delta\theta_{yz} = L^{-\frac{1}{2}} n_{xp} \left[ \frac{n_{ys}^3}{\lambda_s} (n_{ys}^{-2} - n_{zs}^{-2}) \right]^{-\frac{1}{2}} \quad (4)$$

in the xz and yz planes, respectively. The calculated values of $\Delta\theta L^{\frac{1}{2}}$ are 0.036 and 0.065 cm$^{\frac{1}{2}}$.

LBO crystal 15 was "x", "y" and "z" cut with dimensions of 5 mm × 5 mm × 17 mm. The 5 mm × 5 mm faces were polished but not coated, resulting in Fresnel losses of approximately 5% per surface.

Pump source S created the 355 nm frequency tripled input using a Continuum model YG661 Nd:YAG laser. A 200 cm focussing lens (not shown) was placed 58 cm before the cavity mirror 21 to increase the pump energy density in the crystal. The pump intensity at the crystal 15 was fairly uniform over a diameter of 4 mm and had a duration of ~7 ns. The conversion efficiency at room temperature was measured in a 2.3 cm cavity (optical cavity 20) with flat mirrors 21 and 23. Input dichroic mirror 21 was highly reflective from 460 nm to 500 nm, while the output coupler mirror 23 had a transmission of 13% at 480 nm. The input mirror 21 had a transmission of 85% at the pump wavelength and 86% at the idler wavelength of 1.36 um. Similarly, the transmission of the output coupler 23 was 94% and 93% at the pump and idler wavelengths respectively. A Pellin-Broca prism (not shown) was used to disperse the output wavelengths and isolate the signal.

Figure 3:
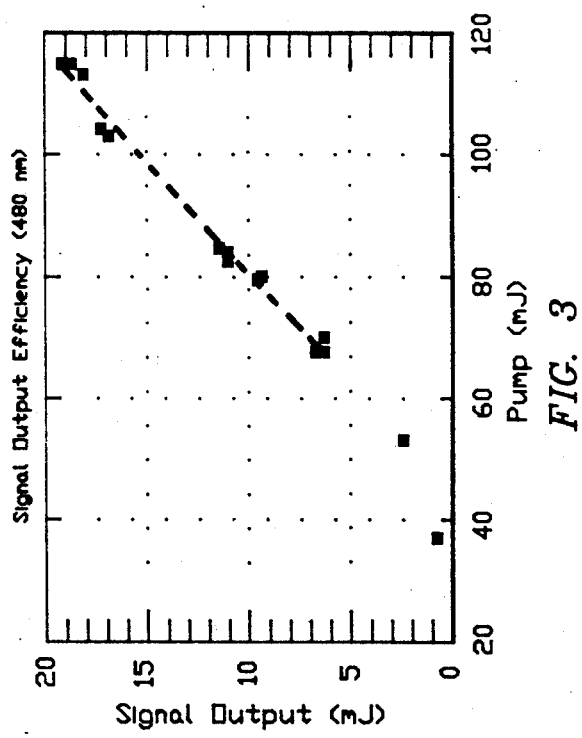
FIG. 3 is a graph showing the signal output energy measured for the z axis lithium borate optical parametric oscillator at 30° C.

The measured output at the signal wavelength (480 nm) versus pump energy incident on the cavity mirror 21 is shown in FIG. 3. The pump source S was operated at 2 Hz repetition rate. A maximum of 19 mJ of blue output was obtained with 112 mJ pump energy, giving a conversion efficiency of 17%.

Temperature tuning was measured in a 3-cm-long cavity, using the same input mirror 21 and a flat output coupler 23 that was 99% reflecting over the tuning range of the signal and >75% transmitting at the pump and idler wavelengths.

Figure 4:
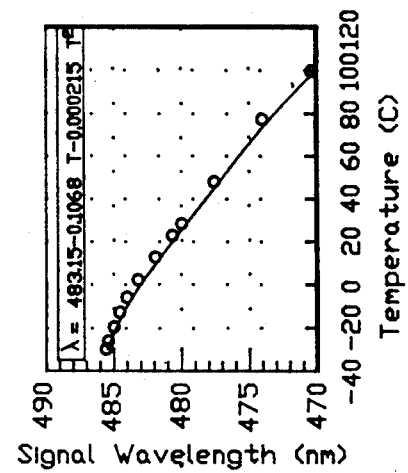
FIG. 4 shows the effects of temperature tuning with respect to output signal wavelengths for the z-axis lithium borate optical parametric oscillator.

FIG. 4 shows the measured signal output wavelength versus temperature, as well as a quadratic fit to the data, over the temperature range of −35° C. to 100° C. The temperature-tuning coefficient is quite large (−0.11 nm/° C.) and permits tuning of the signal over tens of nanometers in the blue. The nominal room-temperature wavelength is near 480 nm, and at −029° C. the signal wavelength matches the H-Beta Fraunhofer line at 486.1 nm.

LBO has been used at temperatures up to 200° C., see the C. Chen et al. article cited above, suggesting that wavelengths of 455 and 459 nm are accessible. These wavelengths are of interest for matching to a cesium atomic resonance filter.

Various optical cavity configurations might be accommodated within the teachings of this inventive concept to implement its essential features, namely, the discovery of the noncritical phase-matched orientation and crystal temperature required to reach 486 nm using a 355 nm pump laser wavelength. Various modifications could encompass the configuration of a ring cavity with more than two mirror or a monolithic cavity where reflective coatings are applied directly to the nonlinear crystal.

Obviously, numerous modifications and variations of the present invention are possible in light of the above teachings. It is therefore to be understood that within the scope of the appended claims the invention may be practiced otherwise than as specifically described herein.

We claim:

1. An apparatus for optical parametric generation from 470 to 487 nm comprising:
    a source of at least a high intensity light pumping wavelength emitted in a vector k;
    an optical resonator having a dichroic and an at least partially reflective mirror appropriately separated to define an optical cavity resonating at at least a wavelength from a 470 to 487 nm, said optical resonator further provided with a lithium borate crystal having a z-axis disposed in said optical cavity, said lithium borate crystal being oriented to receive said pumping wavelength at said vector k colinearly with said z-axis of said lithium borate crystal, said lithium borate crystal thereby being oriented with respect to said high intensity light pumping wavelength to achieve a noncritical phase-matching to provide for a phase-matched output generation from said 470 to 487 nm.

2. An apparatus according to claim 1 further including:
    a temperature tuner in proximity of said lithium borate crystal to effect a precise temperature tuning thereof and to effect an exact H-Beta Fraunhofer wavelength emission therefrom from said 470 to 487 nm.

3. An apparatus according to claim 2 in which said source of pumping wavelength emits at near 355 nm, said optical resonator is appropriately dimensioned and said temperature tuner is appropriately regulated to effect the exact H-Beta Fraunhofer wavelength emission near the H-Beta Fraunhofer wavelength at 486 nm.

4. An apparatus for optical parametric generation from 470 to 487 nm comprising:
    a source of at least a 355 nm pumping wavelength emitted in a vector k;
    an optical resonator having a dichroic and an at least partially reflective mirror appropriately separated to define an optical cavity resonating at at least a wavelength from said 470 to 487 nm, said optical resonator further provided with a lithium borate crystal having a z-axis disposed in said optical cavity, said lithium borate crystal being oriented to receive said pumping wavelength at said vector k colinearly with said z-axis of said lithium borate crystal, said lithium borate crystal thereby being oriented with respect to said 355 nm pumping wavelength to achieve a noncritical phase-matching to provide for a phase-matched output generation from said 470 to 487 nm.

5. An apparatus according to claim 4 further including:
    a temperature tuner in proximity of said lithium borate crystal to effect a precise temperature tuning thereof and to effect an exact H-Beta Fraunhofer wavelength emission therefrom from said 470 to 487 nm.

6. An apparatus according to claim 5 in which said optical resonator is appropriately dimensioned and said temperature tuner is appropriately regulated to effect the exact H-Beta Fraunhofer wavelength emission near the H-Beta Fraunhofer wavelength at 486 nm.

* * * * *